US012623197B2

(12) United States Patent
　　　Ismail

(10) Patent No.:　US 12,623,197 B2
(45) Date of Patent:　May 12, 2026

(54) SOL APPLICATION METHODS

(71) Applicant: Green Sol-Gel Ltd., Sittingbourne (GB)

(72) Inventor: Fanya Ismail, Sittingbourne (GB)

(73) Assignee: Green Sol-Gel Ltd., Kent (GB)

( * ) Notice: Subject to any disclaimer, the term of this patent is extended or adjusted under 35 U.S.C. 154(b) by 896 days.

(21) Appl. No.: 17/799,433

(22) PCT Filed: Feb. 12, 2020

(86) PCT No.: PCT/GB2020/050325
§ 371 (c)(1),
(2) Date: Aug. 12, 2022

(87) PCT Pub. No.: WO2021/160979
PCT Pub. Date: Aug. 19, 2021

(65) Prior Publication Data
US 2023/0338912 A1　　Oct. 26, 2023

(51) Int. Cl.
　B01J 13/00　　　(2006.01)
　B05D 1/02　　　(2006.01)
　(Continued)
(52) U.S. Cl.
　CPC ............ B01J 13/0086 (2013.01); B05D 1/02 (2013.01); B05D 1/28 (2013.01); B05D 3/107 (2013.01);
　(Continued)
(58) Field of Classification Search
　None
　See application file for complete search history.

(56) References Cited

U.S. PATENT DOCUMENTS

| 4,497,733 A | 2/1985 | Retrum |
| 4,540,777 A | 9/1985 | Amort et al. |
| | (Continued) | |

FOREIGN PATENT DOCUMENTS

| CN | 1378581 A | 11/2002 |
| CN | 101928515 A | 12/2010 |
| | (Continued) | |

OTHER PUBLICATIONS

Egyptian Office Action, Application No. 2022081123, pp. 1-5, received from EP associate Jun. 5, 2024.

(Continued)

*Primary Examiner* — Michael Forrest
(74) *Attorney, Agent, or Firm* — MacMillan, Sobanski & Todd, LLC

(57)　　　　　　ABSTRACT

A method comprising providing a sol comprising a solvent; contacting the sol with a precipitation initiator to initiate precipitation of the sol, wherein the precipitation initiator is different to the solvent; and applying the precipitating sol to a product. The methods of the invention may be used with sols comprising a solvent, a metal alkoxide, and optionally a biopolymer and/or a catalyst, with alkoxides comprising metals, organically modified alkoxides comprising metals, alkoxides comprising metalloids, and organically modified alkoxides comprising metalloids all being encompassed by the term 'metal alkoxide'. Also disclosed is an apparatus for use in the method comprising a first storage vessel; a second storage vessel; one or more pumps; and one or more delivery means.

33 Claims, 5 Drawing Sheets

10

11 — Providing a sol comprising a solvent

12 — Contacting the sol with a precipitation initiator to initiate precipitation of the sol 13 — Applying the precipitating sol to a product

(51) Int. Cl.
    *B05D 1/28*         (2006.01)
    *B05D 3/10*         (2006.01)

(52) U.S. Cl.
    CPC ...... *B05D 2210/00* (2013.01); *B05D 2401/30*
             (2013.01); *B05D 2602/00* (2013.01)

(56)          References Cited

U.S. PATENT DOCUMENTS

| | | | | |
|---|---|---|---|---|
| 4,754,012 | A * | 6/1988 | Yoldas | C09D 183/04 |
| | | | | 528/21 |
| 5,008,167 | A * | 4/1991 | Yu | G03G 5/142 |
| | | | | 430/525 |
| 5,670,283 | A * | 9/1997 | Kato | G03F 3/105 |
| | | | | 430/96 |
| 6,500,562 | B1 * | 12/2002 | Hosoi | G03G 13/16 |
| | | | | 428/514 |
| 6,743,467 | B1 | 6/2004 | Jones et al. | |
| 7,780,875 | B2 | 8/2010 | Asgari | |
| 8,715,405 | B2 | 5/2014 | Le Blanc et al. | |
| 10,556,215 | B2 | 2/2020 | Kemnitz | |
| 2004/0120884 | A1 | 6/2004 | Sherman | |
| 2022/0250920 | A1 | 8/2022 | Ismail | |
| 2024/0101824 | A1 | 3/2024 | Ismail | |

FOREIGN PATENT DOCUMENTS

| | | |
|---|---|---|
| CN | 102079947 A | 6/2011 |
| CN | 104854033 A | 8/2015 |
| CN | 110061226 A | 7/2019 |
| EA | 011516 B1 | 4/2009 |
| JP | S5247702 A | 4/1977 |
| JP | 2018118489 A | 8/2018 |
| RU | 2415169 C2 | 3/2011 |

OTHER PUBLICATIONS

Egyptian Office Action, Application No. 2022081123, English Translation, p. 1, received from EP associate Jun. 5, 2024.
Vietnamese Substantive Examination, dated Jan. 22, 2025, Application No. 1-2022-05819.
Eurasian Patent Organization Notice of the Need to Submit Additional Materials, Application No. 202292323, dated Jul. 21, 2023.
South Korean Office Action, Application No. 10-22-7031618, pp. 1-7, received from EP associate Aug. 8, 2024.
South Korean Office Action, Application No. 10-22-7031616, English Translation, p. 1, received from EP associate Aug. 8, 2024.
Brazilian Office Action, Application No. BR112022015929-3, pp. 1-4, dated Aug. 5, 2024, received from EP associate Sep. 9, 2024.
Brazilian Office Action, Application No. BR112022015929-3, pp. 1-2 - English Translation, dated Aug. 5, 2024, received from EP associate Sep. 9, 2024.
Chilean Office Action, Application No. 202202169, dated Mar. 28, 2024.
Chilean Office Action Report, English Translation, Application No. 202202169, pp. 1-4.
Chinese First Office Action, Application No. 202080098334.0, dated Oct. 26, 2023.
European Communication pursuant to Article 94(3) EPC, Application No. 20707769.4, dated Nov. 15, 2023.
Intellectual Property Office of Singapore Search Report, Application No. 11202252093W, dated Dec. 25, 2023.
Yoon et al., "Synthesis of Tetragonal Barium Titanate Nanoparticles Via Alkoxide-Hydroxide Sol-Precipitation: Effect of Water Addition", Journal of the American Ceramic Society, (2007), vol. 90, No. 1, pp. 311-314.
Hardy, "Colloidal solution. The globulins", The Journal of Physiology, (1905), vol. 33, No. 4-5, pp. 251-337, retrieved from the internet, full article access, URL: https://doi.org/10.1113/jphysiol.1905.sp001126.
Canadian examination report, dated Jun. 10, 2025, Application No. 3,170,655.
Thai examination report, dated Mar. 16, 2025, Application No. 0706/2501-013486.
Israeli office action, dated Feb. 25, 2025, Application No. 135-048IL.
Australian Examination report No. 1, dated Jan. 28, 2026, Application No. 2020428277.
Indian Examination report, dated Jan. 30, 2026, Application No. 202217051916.
Indonesian Examination report, dated Jan. 23, 2026, Application No. P00202209574.

* cited by examiner

SOL APPLICATION METHODS

The invention relates to the application of colloidal solutions (known as sols) to products and methods of performing the same. More particularly, the invention relates to methods of using sols to impart desirable properties to products.

Paper, cardboard, wood and other materials are commonly used as packaging for commercial products. The material properties of a product, such as the permeability of packaging materials to water, oils and other fluids may be controlled by using impermeable plastic materials or composites. In many industries such as the food and drink sector, plastics may be applied to otherwise permeable media to facilitate the retention of liquid products within a particular packaging item. Similar methods may also be used to prevent the ingress of fluid into an item that may become compromised by exposure to water, air or other fluids. The plastic materials used in these applications are generally manufactured from hydrocarbon feedstocks and their manufacture presents an associated environmental cost. The materials or chemicals used to manufacture such plastics and the associated by-products may also be toxic. Some plastics may also degrade over time to produce microplastics or through use to release potentially harmful species. Consequently, there are ongoing health and environmental concerns in relation to many common packaging materials.

Commercial manufacturing operations generally seek to produce the highest quantity of products at the lowest cost without sacrificing the provision of quality deemed to be acceptable or desirable by the market into which the product is sold. Plastics remain a low cost commodity and worldwide manufacturing has established well developed and efficient methods to utilise and manipulate plastic materials since their widespread adoption in manufacturing in the 1940s and 1950s. It is generally accepted that a successful plastic replacement technology would be required to be operable at a similar cost and equivalent or reduced ease of use to be accepted by the manufacturing industry. There is therefore a commercial need for an environmentally friendly plastic replacement technology that imparts the same benefits as plastic at an equivalent cost that may be easily adopted in a manufacturing environment.

Sol technology, or sol gel technology, provides a non-toxic alternative to some plastic materials. In this context, the term 'sol' refers to a dispersion of colloidal particles in a liquid solvent. Many sols formed from small colloidal particles are substantially clear and colourless. For example, sols formed from silicon-based functional materials will generally be clear and colourless as the particles forming the sol are sufficiently small that they do not scatter light. Some sols formed from larger particles may be coloured and/or at least partially opaque. For example, sols formed from titanium-based functional materials may be visibly white. Sols may form impermeable and/or anti-microbial and/or alternatively functional coating compositions when applied to a range of materials. Consequently, sols may be used as a barrier and/or as an anti-microbial coating composition and may provide other functionalities such as hydrophobicity, oleophobicity, anti-fouling, anti-biofouling, stain resistance, optical transparency and adhesion promotion. Sols may comprise readily available natural materials that ensure the resulting sols are inexpensive. Additionally, sols may be directly applied to a surface, i.e. without the surface needing to undergo a special preparation process, ensuring that sols are easy to use. Furthermore, some sols have been shown to provide a durable and thermally resistant coating, demonstrating that sols may form resilient and long-lasting functional coatings.

The inventor of the present invention has appreciated that it is possible to utilise a reduced quantity or concentration of sols to impart desirable properties to products that are also achieved by utilising the sol on a 100% basis. The retention of advantageous functional properties by using reduced quantities or concentrations of sols is surprising as it may have otherwise been assumed that lower quantities of sols would be unable to form the extensive crosslinking networks that may be required to achieve a desired functionality, such as impermeability.

The inventor of the present invention has further appreciated that it is possible to utilise a sol that is in the process of precipitating to impart functional characteristics to a product or a coating thereon. The initiation of the precipitation of a sol using a precipitation initiator causes a previously stable colloidal sol suspension to become unstable. The inventor has understood that sols applied to products early in the process of precipitation will still form functional network structures with functionality comparable to those formed when the stable sol is used without further additives or components. A sol in the process of precipitating may exhibit, at least transiently, an increased number of active sites due to the formation of reactive particles, partially dispersed gels and precipitating sols. It is therefore possible to use the sol with a precipitation initiator and use the precipitating sol to coat or impart functionality to a product provided the precipitated sol is applied to the product once the precipitation process is initiated and before the precipitation process is complete. Moreover, a precipitating sol may be used on a less than 100% basis and retain a surprising level of functionality due to the increased number of active sites formed during the precipitation process.

According to one aspect of the invention, there is provided a method comprising (i) providing a sol comprising a solvent, (ii) contacting the sol with a precipitation initiator to initiate precipitation of the sol, wherein the precipitation initiator is different to the solvent, and (iii) applying the precipitating sol to a product.

According to another aspect of the invention, there is provided an apparatus for use in the methods described herein, the apparatus comprising: a first storage vessel; a second storage vessel; one or more pumps; and one or more means of applying a sol and a precipitation initiator stored in the first and second respective storage vessels to a product.

DETAILED DESCRIPTION

Figure 1:
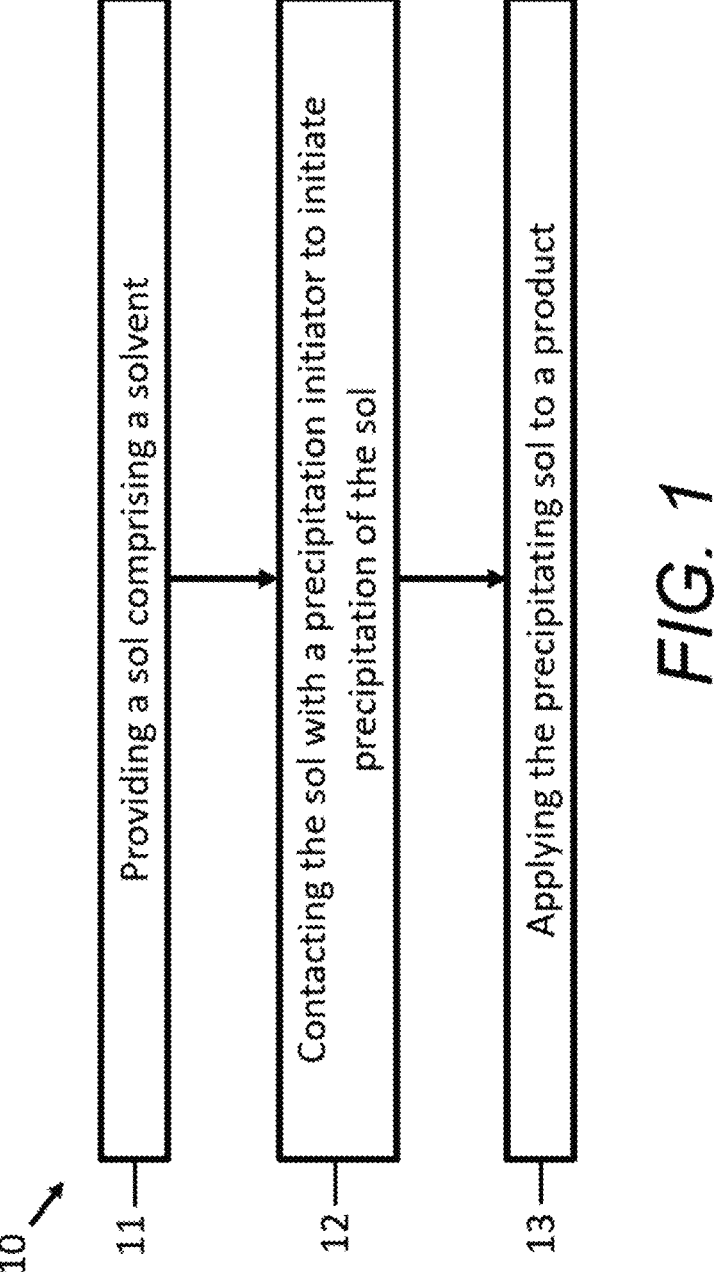
FIG. 1 is an example of a method of imparting one of more desired properties or characteristics to a product or article using sols.

A sol may be formed by dispersing one or more materials of suitably small particle size in a solution. Some sols may further comprise additional components such as a catalyst or functional components. The sols suitable for use in the methods of the invention may be any sol that may be applied, coated or incorporated into a product to impart a beneficial property or characteristic to the resulting product. Sols suitable for use in the methods of the present invention will generally comprise a functional material and a solvent. In an example, the methods of the invention may be used with sols comprising a solvent, a functional metal alkoxide, and optionally a biopolymer and/or a catalyst. The term 'metal alkoxide' includes alkoxides comprising metals, organically modified alkoxides comprising metals, alkoxides comprising metalloids, and organically modified alkoxides comprising metalloids. The solvent used in the formation of the sol may comprise water, one or more alcohols, any other suitable solvent, or any combination thereof. Where present, the one or more alcohols may comprise methanol, ethanol, butanol, ethylene glycol, isopropanol, any other suitable alcohol, and any combination thereof. The biopolymer, where present, may comprise starch based polymer, hemi-cellulose based polymer, cellulose based polymer, lignin based polymer, chitosan based polymer, any other suitable biopolymer or modified biopolymer, and any combination thereof. The sol may additionally, or alternatively, comprise one or more flours derived from natural materials. Suitable flours may include oat flour, barley flour, rye flour, wheat flour, rice flour, bamboo flour, lentil flour, chickpea flour, pea flour, corn flour, or any combination thereof. Where the sol comprises a functional metal alkoxide, the alkoxide will generally conform to the general formula $M(OR)x$ or $R_c$-$M(OR)_x$, where "M" denotes any metal forming the metal alkoxide which may hydrolyse in the presence of a suitable solvent. "R" and "$R_c$" denote alkyl radicals of typically 1 to 30 carbon atoms which may take any suitable form such as straight chain, branched, aromatic or complex. "x" will generally equate to the valence of the corresponding metal ion "M". In an example, R may be a methyl, ethyl, propyl or butyl radical. Where a metal ion "M" has a valency in excess of 1, each R group may be the same. $R_c$ denotes any suitable organic group which will form and maintain a covalent bond with the metal "M" following hydrolysis of the alkoxide. In some examples, R and $R_c$ may be the same. In other examples, R and $R_c$ may be different. Any suitable metal alkoxide may be used. Examples of suitable metal alkoxides include $Si(OR)_4$, $Ti(OR)_4$, $Al(OR)_3$, $Zr(OR)_3$ and $Sn(OR)_4$ as well as $R_c$—$Si(OR)_3$, $R_c$—$Ti(OR)_3$, $R_c$—$Al(OR)_2$, $R_c$—$Zr(OR)_2$ and $R_c$—$Sn(OR)_3$. In specific examples, R may be the methyl, ethyl, propyl or butyl radical. In some specific examples, $R_c$ may be a phenyl group, a cyclopentyl group, or any other suitable organic group capable of maintaining a covalent bond to the metal. The metal of the metal alkoxide may comprise silicon, titanium, aluminium, zirconium, tin, or any other suitable metal. In particular examples, the metal alkoxides may be selected from the group comprising $Ti(isopropoxy)_4$, $Al(iso-propoxy)_3$, $Al(sec-butoxy)_3$, $Zr(n-butoxy)_4$, $Zr(n-propoxy)_4$, n-propyltriethoxysilane, tetrapropyl orthosilicate, titanium (IV) tert-butoxide, titanium(IV)isopropoxide, triethyloxysilane, methyltriethyloxysilane, triethoxy(octyl)silane, phenyl-triethoxysilane, titanium(iv) ethoxide, triethoxy-silylcyclopentane, (3-glycidyloxypropyl) trimethoxysilane, cyclopentyltriethoxysilane, and any 3-amino-propyltriethoxysilane, triethoxy-3-(2-imidazolin-1-yl)propylsilane, combination thereof. In selected examples, the metal alkoxides may be selected from the group comprising tetraethoxysilane, phenyltriethoxysilane, methyltriethyloxysilane, and any combination thereof. In further selected examples, the metal alkoxides may be selected from the group comprising tetrapropyl orthosilicate, titanium(IV) tert-butoxide, titanium(IV) isopropoxide, triethyloxysilane, methyltriethyloxysilane, triethoxy (octyl) silane, phenyl-triethoxysilane, titanium(iv) ethoxide, triethoxy-silylcyclopentane, (3-glycidyloxypropyl) trimethoxysilane, cyclopentyltriethoxysilane, or any combination thereof. In additional selected examples, the metal alkoxide may be selected from the group comprising $Ti(isopropoxy)_4$, $Al(isopropoxy)_3$, $Al(sec-butoxy)_3$, $Zr(n-butoxy)_4$, $Zr(n-propoxy)_4$, and n-propyltriethoxysilane based alkoxides, and any combination thereof.

The method of the present invention is illustrated in FIG. 1. The method 10 generally comprises providing a sol comprising a solvent 11; contacting the sol with a precipitation initiator to initiate precipitation of the sol 12; and applying the precipitating sol to a product 13.

The sol for use in the methods of the present invention may be formed by dispersing a functional material of suitably small particle size in a solvent and adding a catalyst. The functional material may be a particle with at least one dimension in the range of approximately 1 nm to 1 μm. An alternative method of making a sol that may be used in the methods of the invention comprises dispersing a functional material in a solution comprising a catalyst and then adding a biopolymer and/or one or more other additives. Where a biopolymer and/or one or more other additives are present, a sol comprising a functional material may generally be 'stored for a period of time, prior to addition of the biopolymer and/or the one or more other additives. Additional functional additives may be added at any stage during the method of making the sol. For example, in a sol comprising a biopolymer the additional functional additive may be added before or after the biopolymer has been dispersed in a solution but before the alkoxide has been added, or alternatively, after the biopolymer and alkoxide have been added to the solution. One or more additives may be added at different stages of making the sol. The additives may be used to adjust the properties of the sol, e.g. to make the sol suitable for UV, visible or IR curing, and/or may be used to add additional functionality to a coating prepared using the sol, e.g. colour, pH sensitivity, conductivity, fluorescence. The additives used will vary depending on the intended use of the sol. Suitable additives include photoinitiators, resins, oils, dyes (including pH sensitive dyes and fluorescent dyes), salts, surfactants, composite particles, mineral or other inorganic particles (including carbonates, carbides, oxides, hydroxides, nitrates, bromides, and the like), and metal particles (including alloys and particles comprising one or more metals and one or more additional non-metal components). The sols suitable for use in the method of the invention may be also formed without the presence of any additives or biopolymers. More particularly, the sols suitable for use in the methods of the invention may be wholly or substantially free of additives and/or biopolymers during formation and/or use. Moreover, the sols suitable for use in the methods of the invention may be formed distinct from the product to which the sol is to ultimately be applied, where appropriate. In such an example, the sol and the product to which the sol is to be applied will be brought together following formation of the sol.

Sols are generally stable by definition. A sol for use in the method of the invention may therefore be formed some time prior to contacting the sol with the precipitation initiator. For example, the sol may be formed and stored for a period of up to 1 hour, up to 1 day, up to 1 week, up to 1 year, up to 10 years, or more prior to contacting with the precipitation initiator. However, the sol may also be formed immediately prior, less than 2 seconds prior, less than 15 seconds prior, less than 30 seconds prior, less than a minute prior, or less than an hour prior to contacting the sol with the precipitation initiator.

The sol may be formed in geographical proximity to the precipitation initiator prior to use with the methods of the invention. Alternatively, the sol may be formed distant from the site at which the method is to be performed and then transported to that site. In an example, the sol may be formed at a manufacturing site in an on-line process a matter of seconds before it is contacted with the precipitation initiator. In another example, the sol may be formed in an independent manufacturing facility and then transported by road, rail, air, sea, pipeline or equivalent to a geographically distinct site where the sol is contacted with the precipitation initiator.

The precipitation initiator used in the methods of the invention may be any element, chemical or compound that causes the sol to lose stability and begin precipitation. The particular precipitation initiator selected for use in the method of the invention will depend upon the nature of the sol formed in the method. In an example, a sol formed using water as a solvent will not generally begin precipitating upon the addition of further water. In this example, water is not a precipitation initiator as it does not cause the sol to begin precipitating. In contrast, the addition of water to a sol comprising an organic solvent may initiate precipitation of the sol. In this example, water would be considered to be a precipitation initiator. Preferably, the precipitation initiator may be a liquid. Preferably, the precipitation initiator is more environmentally friendly than the solvent used in the formation of the sol. Further preferably, the precipitation initiator is easily obtainable and/or available commercially at a lower price per mass or volume than the solvent used in the formation of the sol. A precipitation initiator with these characteristics provides a method by which the sol can be applied to a product in both an environmentally friendly and cost effective manner. The method of the present invention is therefore advantageous as it provides an easy way for sols to be used in manufacturing applications at reduced cost (relative to using the sols themselves) with environmentally friendly materials. The method of the present invention may therefore be used to replace plastics in some manufacturing processes without placing excessive burden upon the manufacturing industry.

In an example where the sol comprises ethanol or isopropanol and one or more functional components which are insoluble in water, the precipitation initiator may comprise water. The water may take any suitable form and therefore may initiate precipitation when mixed with the sol as a liquid. Alternatively, or additionally, water vapour may be passed over or bubbled through the sol in order to initiate precipitation. In another example, where the sol comprises water and one or more functional components which are insoluble in ethyl acetate, the precipitation initiator may comprise ethyl acetate. However, the precipitation initiator is not limited to an alternative solvent and may be a solid, liquid or gas which otherwise disrupts the stability of the sol. In an example, the precipitation initiator may be an acid or a base which alters the pH of the sol to a pH at which the sol transitions from a sol to a colloidal suspension which is unstable and begins precipitating. In another example, the precipitation initiator may be one or more materials that increase the concentration of dispersed molecules in the sol such that the sol transitions beyond its critical coagulation concentration. In a further example, the precipitation initiator may be an ionic solid that when added to the sol sufficiently disrupts the charge balance of the sol such that the sol begins precipitation. An oil may also be used as a precipitation initiator. The skilled person, with the benefit of this disclosure, will be able to readily identify suitable precipitation initiators.

The precipitation initiator may comprise or consist essentially of one or more functional additives. The additives may be used to adjust the properties or characteristics imparted to the product by addition of the sol. For example, the additive may be added to the liquid to make a product suitable for UV, visible or IR curing, and/or may be used to add additional properties such as colour, pH sensitivity, conductivity or fluorescence to a coating formed on a product. The additives used will vary depending on the intended use of the product. Suitable additives include photoinitiators, resins, oils, dyes (including pH sensitive dyes and fluorescent dyes), salts, surfactants, composite particles, mineral or other inorganic particles (including carbonates, carbides, oxides, hydroxides, nitrates, bromides, and the like), and metal particles (including alloys and particles comprising one or more metals and one or more additional non-metal components).

Contacting the sol and the precipitation initiator begins the precipitation of the sol and the formation of a 'precipitating sol'. Preferably, the precipitation initiator and sol are selected such that precipitation occurs over the next 5 minutes, 10 minutes, 15 minutes, 30 minutes, 45 minutes, 1 hour, 2 hours, 5 hours, or more following contact. Precipitation is considered to have finished when the sol and precipitation initiator mixture is no longer able to impart its intended functionality to a product to which it is applied. Without being bound by theory, the precipitating sol may therefore be considered as a transient nanodispersion, microdispersion or suspension. In an example, precipitation may be considered to have finished when the sol has precipitated sufficiently that it is observed to have started settling on the base of a container in which the sol and precipitation initiator have been mixed. In another example, precipitation may be considered to have finished when the sol has wholly settled on the base of a container in which the sol and precipitation initiator have been mixed. The precipitation of the sol may also be tracked and assessed using analytical techniques such as optical analysis methods, turbidity measurement techniques, and the like.

The amount of precipitation initiator required to initiate precipitation of the sol will depend upon the specific properties of the sol and the selected precipitation initiator. In an example, where the precipitation initiator is a liquid, the amount of precipitation initiator required may be the amount required to disrupt the solvent system of the sol to initiate precipitation. In another example, where the precipitation initiator is a solid, the amount of precipitation initiator required may be the amount required to disrupt the charge equilibrium of the sol such that the sol loses stability and begins to precipitate. While it may be possible and advantageous to use a minimal amount of precipitation initiator in some situations, it is generally beneficial to utilise a precipitation initiator that is available in large quantities at low cost such that the active sol may be diluted and applied to a greater quantity of products. The ratio of sol to precipitation initiator may be between 1:500 and 100:1. In an example, the ratio of sol to precipitation initiator may be between 1:200 and 1:2. In a further example, the ratio of sol to precipitation initiator may be between 1:100 and 1:10. In yet another example, the ratio of sol to precipitation initiator may be between 1:100 and 1:75. In a yet further example, the ratio of sol to precipitation initiator may be between 1:100 and 1:90.

The precipitation initiator and the sol may be contacted in any suitable manner. For example, flow mixing, converging process streams, plunging, spraying, direct contact, transient contact, sprinkling, vortex mixing, blending, agitating, stirring, and the like. In some examples, the sol may be added to the precipitation initiator. In other examples, the precipitation initiator may be added to the sol. In yet other examples, the sol and the precipitation initiator will be brought together by moving, transporting or flowing both the sol and the precipitation initiator together.

Contacting the sol with the precipitation initiator may result in the sol forming a coating upon the container, vessel, piping or conduit in which the contacting occurs or an equivalent component downstream of the contacting process. However, the formation of a coating may be avoided by choosing a container, vessel, piping or conduit constructed from a material onto which a coating will not form. In an example, a precipitating sol may form a coating on a glass container, but not a plastic container. Additionally, or alternatively, a coating may be intentionally formed on the inside of a container, vessel, piping or conduit as subsequent contacting events may not form further coatings, or build upon the previous coating, allowing the precipitation to proceed as intended. The skilled person, with the benefit of this disclosure, will be able to identify a suitable remedy depending on the behaviour and properties of the sol and precipitation initiator selected.

Once the sol and the precipitation initiator have been contacted, the precipitating sol, hereinafter referred to as 'the mixture', is applied to one or more products to impart desirable characteristics to those products. Once precipitation has begun, the sol loses its activity gradually as precipitation proceeds. Consequently, it may be advantageous to apply the mixture to a product before precipitation has completed such that the mixture is applied within a period of time prior to the mixture losing effective activity. It is therefore advantageous to use the mixture shortly after the sol and the precipitation initiator have been contacted. For example, the mixture may be applied to a product immediately, within 2 seconds, within 5 seconds, within 10 seconds, within 15 seconds, within 30 seconds, within 1 minute, within 5 minutes, within 15 minutes, within 30 minutes, within 1 hour, or within any other suitable time period following contacting of the precipitation initiator with the sol.

The term 'product' as used herein is intended to include intermediate, work in progress and unfinished products and their components in addition to otherwise finished goods and articles. For example, applying the mixture to a product may involve adding the mixture to a paper pulp slurry, air-laid pulp or dry paper pulp prior to formation of paper sheets therefrom. Applying the mixture to a product may also involve coating all or a portion of the outer surface of an otherwise finished product with the sol dispersion or suspension. In general, the mixture may be applied to the product by any suitable method, including brushing, spraying, spray drying, rolling, dropping, injecting, transferring, submersion, immersion, mixing, spreading, padding, and the like. Individual or multiple methods of application may be utilised to apply the mixture to a single product or article depending on the nature of the product and the properties and characteristics desired. For example, an impermeable coating will generally be applied to a product via brushing, spraying, padding, immersion or rolling. Providing a bulk mass for further process with antimicrobial activity may, in an example, be achieved by mixing the mixture into an intermediate material. The product may be formed from any suitable material. More particularly, the product may comprise wooden products, textile products, leather products, metal (including alloy) products, concrete products or construction materials, cardboard products, paper or pulp products, plastic products, glass products, ceramic products, composite materials, sands, bricks, marbles, soils, paints, painted products, food and beverage products, medical devices, pharmaceutical products and combinations thereof.

Without being bound by theory, the functional characteristics imparted to products treated using sols may arise due to the formation of extensive cross-linking between the reactive functional groups of the components which form the sol. Moreover, the use of a sol that is in the process of precipitating provides for both a continuous coating medium from the sol that remains in liquid form, and the presence of distinct reactive particles formed due to the initiation of precipitation. The particles may perform a filling function by partially or fully blocking or obstructing otherwise porous or permeable passages on the surface of a product. Therefore, by coating a product with a combination of sol and discrete reactive particles, the method allows the mixture to act as coating, filler and binder simultaneously for materials of a porous and/or permeable nature. When the mixture is applied to a product, the precipitating sol will cover the surface of the product and will flow into any pores, indents, apertures, or similar features on the surface and the inner layers of the product. The liquid carries the precipitating material into the porous and/or permeable material. Any solid or precipitated matter already present in the precipitating sol will be carried into the structure until partially or fully obstructed, thus filling the pore volume on the surface of the product. Any sol remaining in the liquid phase when applied to the product will coat the exterior of the product, but may also penetrate further into the product than the solid material. Once the liquid sol component has penetrated the surface of the product, the sol may continue to precipitate, thus forming solid material in the internal matrix of the product surface. Precipitation will therefore occur in portions of a product's surface topography and internal structure that may be reached by the liquid sol upon application but that could not be reached by the precipitating solid particles upon initial direct application. Once settled, the liquid sol coating surfaces will therefore form continuous coating layers with discrete particulates formed prior to or during application filling surface accessible pores. Internal void spaces will become filled via further precipitation of the sol post-coating or by the formation of internal coatings in the internal void spaces of the product as the liquid sol dries. In this manner, the precipitating sols will coat the surface of a product, fill pore volume with precipitated material, and bind material together by forming solids in the internal structure of a surface into which it has permeated. Such binding, filling and coating is not generally possible with the sol when used alone in the absence of a precipitation initiator as the lone sol will either form a surface coating and/or permeate into the product structure; both the filling of internal voids and the surface pores with particulate is not generally achievable. Additionally, binding, filling and coating is not achievable by a fully precipitated coating as the functional component will be solid and will be unable to permeate beyond the surface topography of a product to which it is applied. Similar results would be obtained by utilising a solid functional additive dispersed in a liquid medium, as the solid functional additive will be unable to permeate beyond the surface topography of a product. Depending on the sol used in conjunction with the methods described herein, the precipitating material may be in the form of discrete particles, or may be in the form of a partial gel. The use of a precipitating sol mixture may also allow a product to be coated with a thinner coating layer than would be achievable using the liquid sol alone without precipitation. Furthermore, the use of a precipitating sol mixture may also allow a product to be formed in the absence of additional fillers and binders that are normally required in its formation. For example, the use of a precipitating sol mixture with virgin pulp may allow for the formation of paper products without additional binders or fillers.

Figure 2:
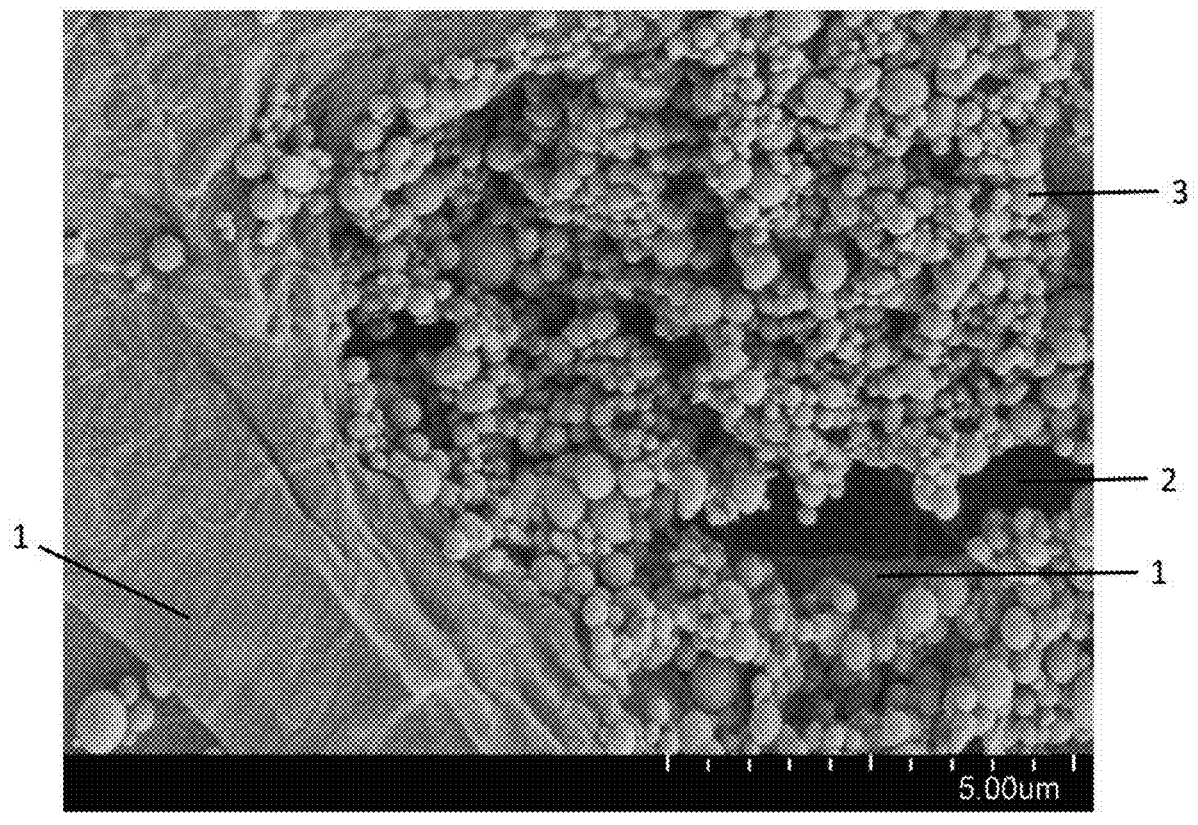
FIG. 2 is a Scanning Electron Microscope (SEM) image of the surface of a product to which a precipitating sol has been applied according to the methods disclosed herein.
Figure 3:
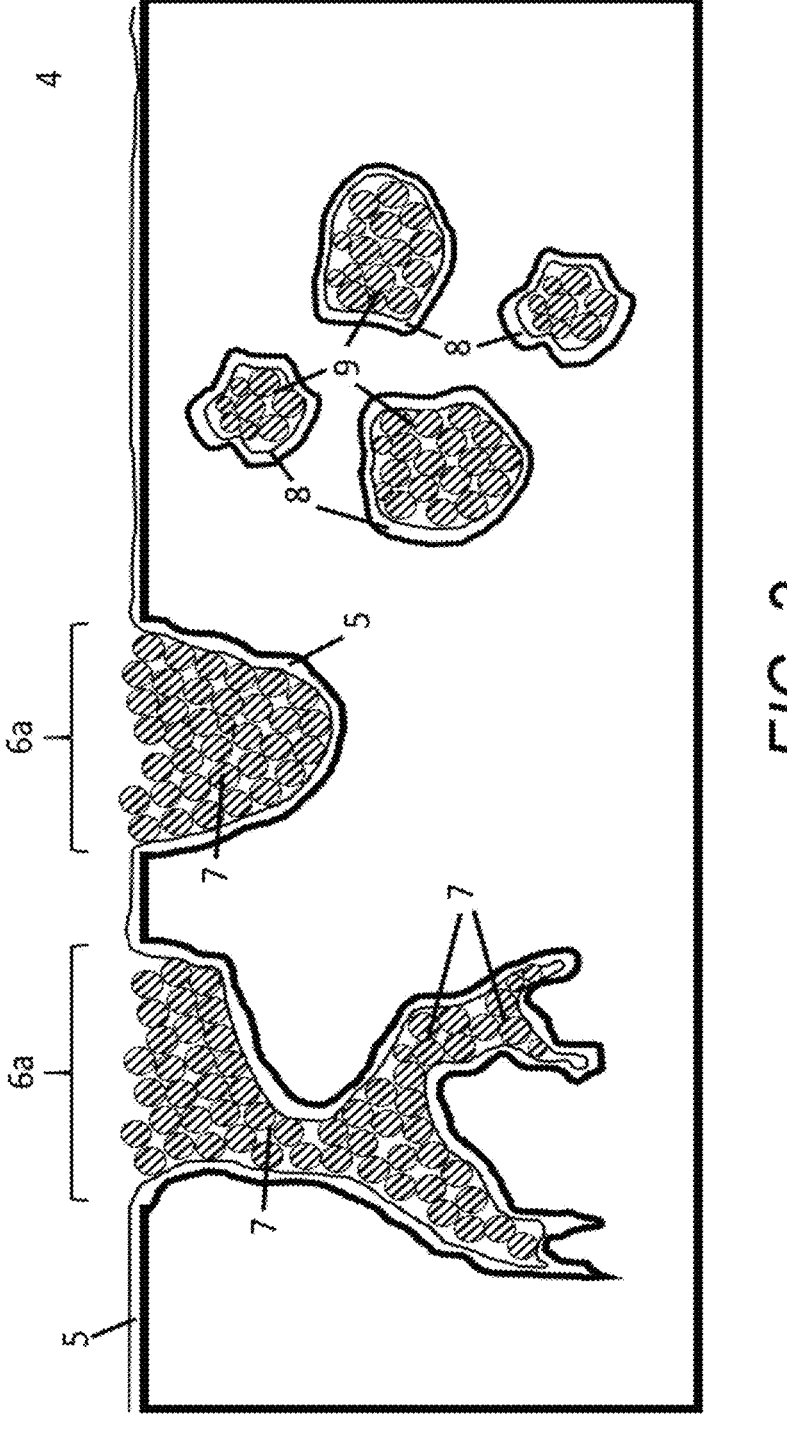
FIG. 3 is a schematic illustration of the surface of a product following application of a precipitating sol.

FIG. 2 shows a Scanning Electron Microscope (SEM) image of a fibrous product coated using the methods described herein. The SEM image shows areas where a continuous coating 1 has been formed where the precipitating sol has been dried, and a surface accessible pore 2 which has been filled with precipitated particulates 3. FIG. 3 shows a schematic representation of a coated material. In FIG. 3, a product 4 has been coated with a precipitating sol, forming coating layer 5 over the outer surface of the product 4 and its exposed surface pores 6a. The solid from the precipitating sol 7 has further filled the accessible pore spaces on the surface of the product. Where the sol has permeated into the internal product structure, internal coatings 8 and further precipitation 9 in the internal void spaces 6b. The precipitating sol therefore performs the function of a coating 5, a filler 7, and a binder 8, 9.

The method of the invention may comprise one or more additional method steps. For example, the method may further comprise drying the precipitating sol following application to the product. However, the sol may be dried passively in air at room temperature and no direct or indirect application of heat or energy is necessary to dry the sol. Heat energy is not required in the methods disclosed herein and hence, in an example, the method may explicitly exclude a drying step, a heating step and/or the provision of energy to the precipitating sol once applied to a product. Additional optional method steps may include adding one or more functional additives to the sol, precipitation initiator or precipitating sol; heating or cooling the sol, precipitation initiator or precipitating sol; altering the pH of the sol, precipitation initiator or precipitating sol; testing the properties or characteristics of the product or a coating thereon via one or more test methods; and passing one or more gases across the surface of a product coated with the precipitating sol. In another example, the method may further comprise providing a second sol comprising a solvent; contacting the second sol with a precipitation initiator to initiate precipitation of the second sol, wherein the precipitation initiator is different to the solvent; and applying the precipitating second sol to the product to which the first sol was applied.

The methods of the present invention are surprising because it would otherwise have been assumed that low concentrations of sol would exhibit lower or reduced efficacy. The methods of the present invention allow sols to impart some desirable properties at concentrations as low as 1% when mixed with a suitable precipitation initiator. Moreover, the residual activity demonstrated by sols in the process of precipitating is further surprising as the use of sols that have completed precipitating does not generally impart the beneficial properties obtained by using the sol on a 100% basis. These surprising effects can be demonstrated when considering the method using a sol intended to impart a water impermeable coating. The formation of a sol coating using a low concentration of sol, delivered in a precipitating medium may have previously been considered to form isolated localised coating regions upon a coated object, thus allowing permeation of water around the localised areas where the sol had collected. However, Example 2 and the SEM image provided in FIG. 2 have demonstrated that this is not the case and that a fully impermeable layer may be formed.

The methods described herein may be performed at varying scale. The methods are applicable to small scale processes such as a laboratory or workshop but yet may also be performed on a large scale such as an industrial manufacturing site. The methods may be carried out manually. For example, a technician may form a sol by manually mixing components, add a precipitation initiator into the manually mixed sol, and then use a hand brush to manually apply the precipitating sol to a product. Alternatively, the methods described herein may be performed using an apparatus such as the apparatus shown in FIG. 4.

Figure 4:
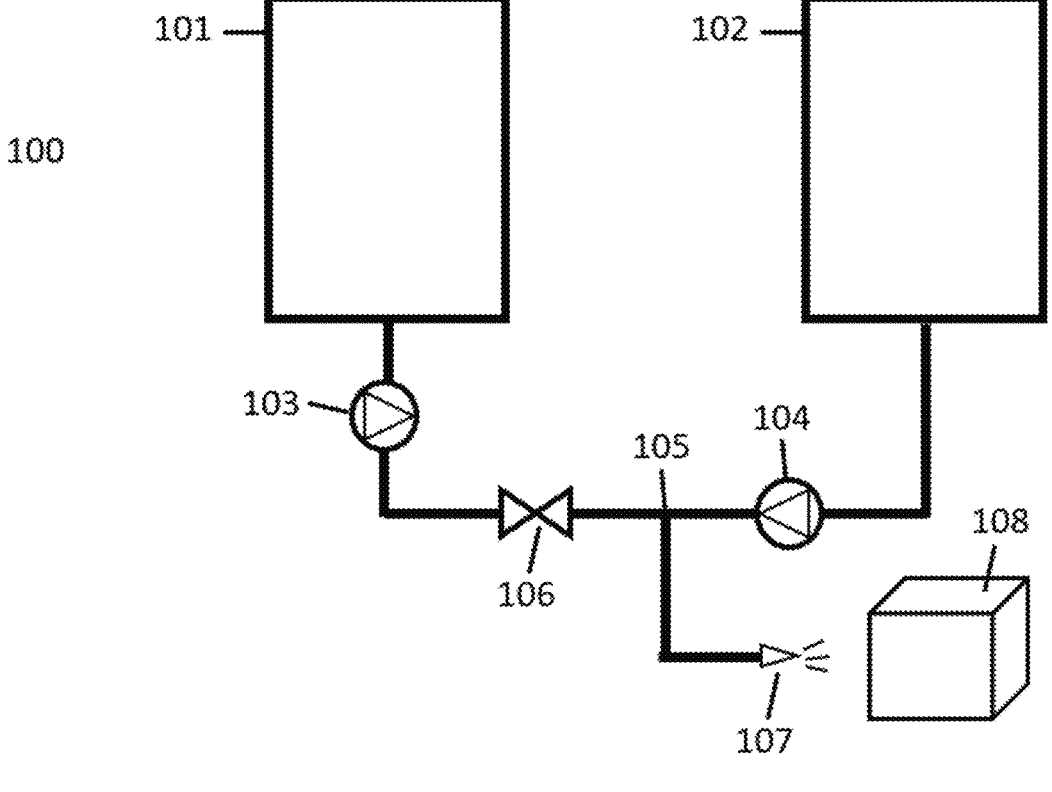
FIG. 4 is an example of an apparatus that may be used in the methods described herein to impart one or more desired properties or characteristics to a product or article using sols.

FIG. 4 shows an apparatus comprising a first storage vessel 101 and a second storage vessel 102. The first storage vessel may be used to store the precipitation initiator and the second storage vessel may be used to store the formed sol. However, it is envisaged that either the first or second storage vessel could be used to store either the sol or the precipitation initiator, as required, suffice that suitable conveying means are present to transport the sol or precipitation initiator as required. The first storage vessel 101 is connected to a conduit or pipe fitted with a first pump 103 whereas the second storage vessel 102 is connected to a conduit or pipe fitted with a second pump 104. The pumps may be any suitable type, design or configuration of pump such as a centrifugal pump, or positive displacement pump.

In use, the pumps 103, 104 may be operated to draw sol and precipitation initiator from the first and second storage vessels towards mixing point 105 where the conduits or pipes from each of the first and second storage vessels meet. It is envisaged that additional features may be included in the system at the mixing point 105 such as a mixing chamber or any other suitable feature to facilitate the contacting of the sol and precipitation initiator. Flow from the first or second storage vessels 101, 102 may be further controlled using one or more valves 106 positioned in the relevant line. Any suitable type of valve may be used including gate, globe, plug, ball, butterfly and diaphragm arrangements. Advantageously, a valve may be selected such that it is controllable to allow a selectable flow rate of precipitation initiator or sol to pass through the valve in a given time period. As such, the ratio of sol to precipitation initiator may be controlled. Moreover, depending on the required ratio of sol to precipitation initiator, the pump drawing the sol from storage vessel 102 towards mixing point 105 may be a metering pump or dosing pump which may be controlled to provide a controlled quantity of sol to the mixing point 105.

Once contacted, the precipitating sol is then directed towards one or more delivery means for applying the precipitating sol to a product 108. In FIG. 4, the delivery means is a spray nozzle 107 although alternative applying means may be used.

The apparatus of FIG. 4 will generally be used in conjunction with a liquid precipitation initiator. However, one or more pumps and valves may be substituted with various suitable solid conveying systems such as a screw conveyors, belts, bucket elevators, or equivalent to allow a solid precipitation initiator to be transported into contact with the sol.

The apparatus of FIG. 4 may further comprise a control system (not shown). The control system may be configured to cause the apparatus 100 to carry out the method of the present invention. The control system may be a computer. The computer may comprise a processor and one or more computer readable storage media storing instructions that, when executed by a processor cause the apparatus to carry out the method of the invention. The control system may receive one or more inputs from a user such as the ratio of sol to precipitation initiator, the flow rate of material required, or the total quantity of precipitating sol to be applied to a product.

Figure 5:
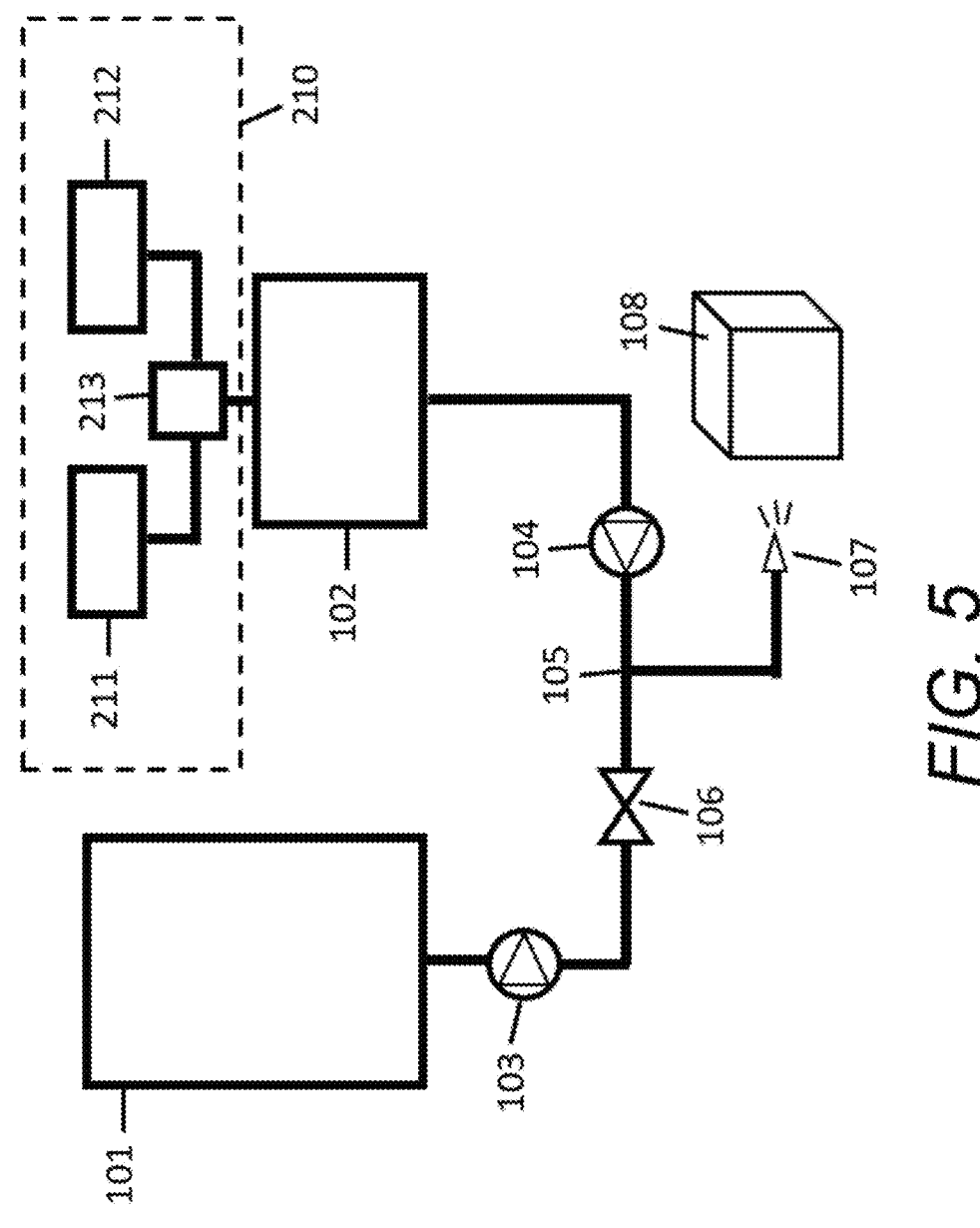
FIG. 5 is an example of another apparatus that may be used in the methods described herein, wherein the sol is formed using the apparatus prior to contacting with the precipitation initiator.

FIG. 5 shows another apparatus 200 that may be used with the methods of the invention, the reference signs 101 to 108 denoting the same technical features as denoted in FIG. 4. The apparatus of FIG. 5 differs from that of FIG. 4 in that the apparatus comprises means 210 for forming the sol prior to the sol being contacted with the precipitation initiator. The sol forming means 210 comprises solvent storage vessel 211 and functional additive storage vessel 212. One or more pumps or conveying means (not shown) will direct the solvent and functional additive to mixing device 213 to form the sol. The sol is then passed to storage vessel 102 where it may be stored for a period of time or used immediately in the method of the invention. Additional storage vessels may be used and directed to the mixing device 213 to form sols comprising additional components if desired. It is also envisaged that the components forming the sol may be transferred and mixed directly into storage vessel 102 if desired. The apparatus of FIG. 5 may therefore be used to carry out the entirety of the method of the invention.

The invention may be further understood with reference to the following examples.

EXAMPLES

The following examples provide various methods by which sols may be formed.

Example 1 Formation of a Sol

A silicon alkoxide precursor mixture (5.2 ml) composed of 50% tetraethoxysilane and 50% phenyltriethoxysilane were added dropwise to a mixture of ethanol (10 ml) and aqueous HCl (0.1M, 2 ml). The solution was stirred at room temperature for approximately 6 hours until formation of a sol.

Example 2 Formation of a Sol

Cationic Starch (CS; 7 mg) was dispersed in a mixture of ethanol (10 ml) and aqueous HCl (0.1 M, 1.6 ml) to produce a solution with pH 2. To this stirred solution, silicon alkoxide precursor (5.2 ml) composed of 100% methyltriethyloxysilane was added dropwise before stirring was continued for a further 2 hours.

Example 3 Formation of a Sol

Chitosan (6 mg) was dispersed in a mixture of ethanol (12 ml) and aqueous HCl (0.1 M, 2 ml) to produce a solution with pH 2. To this stirred solution, silicon alkoxide precursor mixtures (6 ml) composed of 50% tetraethoxysilane and 50% phenyltriethoxysilane were added dropwise before stirring was continued for a further 1.5 hours.

Example 4 Formation of a Sol

Methyltriethyloxysilane (100%, 7.5 ml) was added dropwise to a mixture of ethanol (15 ml) and aqueous HCl (0.1 M, 2 ml). The solution was stirred for approximately 1 hour until formation of a sol.

Example 5 Formation of a Sol

A silicon alkoxide precursor mixture (5 ml) composed of 50% triethoxysilane and 50% methyltriethyloxysilane was added dropwise to a mixture of ethanol (10 ml) and aqueous NaOH (0.1 M, 2 ml). The solution was stirred for approximately 30 minutes until formation of a sol.

Example 6 Formation of a Sol

Titanium isopropoxide (9 g) was added to a mixture of ethanol (6.5 ml) and aqueous HCl (0.1 M, 1.8 ml). The mixture was stirred for approximately 30 minutes until formation of a sol.

Example 7 Formation of a Sol

Wheat flour (7 mg) was dispersed in a mixture of ethanol (8 ml) and aqueous NaOH (0.1 M, 2 ml) to produce a solution with pH 13. To this stirred solution, silicon alkoxide precursor mixtures (5.2 ml) composed of 50% triethoxysilane and 50% methyltriethyloxysilane were added dropwise before stirring was continued for a further 30 minutes.

Example 8 Formation of a Sol

Methyltriethyloxysilane (100%, 5.8 ml) was added dropwise to a mixture of ethanol (6.2 ml) and aqueous NaOH (0.1 M, 1.5 ml). The solution was stirred for approximately 30 minutes until formation of a sol.

Example 9 Formation of a Sol

Zirconium isopropoxide (8.5 g) was added to a mixture of ethanol (6.3 ml) and aqueous HCl (0.1 M, 1.6 ml). The mixture was stirred for approximately 1 hour until formation of a sol.

Example 10 Formation of a Sol

Cationic Starch (CS; 5 mg) was dispersed in a mixture of ethanol (10 ml) and aqueous NaOH (0.1 M, 1.5 ml) to produce a solution with pH 13. To this stirred solution, methyltriethyloxysilane (5.2 ml) was added dropwise before stirring was continued for a further 20 minutes.

Example 11 Formation of a Sol

Wheat flour (5 mg) was dispersed in a mixture of ethanol (6 ml), aqueous NaOH (0.1 M, 1 ml) and methyltriethoxysilane (1 ml) to produce a solution with pH 13. To this stirred solution, silicon alkoxide mixtures (1 ml) composed of 50% tetraethoxysilane and 50% phenyl-triethoxysilane were added dropwise before stirring was continued for a further 30 minutes.

Example 12 Formation of a Sol

Aluminium isopropoxide (9.2 g) was added to a mixture of ethanol (6.5 ml) and aqueous HCl (0.1 M, 1.6 ml). The mixture was stirred for approximately 1 hour until formation of a sol.

The following examples illustrate various methods of using sols.

Example 13

The sol of example 1 was mixed with 200 ml of water for 10 seconds at room temperature to initiate precipitation. White solid was observed to form in the previously clear solutions. The mixture was then brushed onto the internal surface of a cardboard cup within 5 minutes of the first observable formation of the white solid. The mixture was allowed to dry on the surface of the cardboard cup.

25 ml of water was added to each of the coated cardboard cup and a control cardboard cup with no coating. Water was seen to immediately soak through the uncoated cardboard cup and leak out into the surrounding area. The 25 ml of water in the coated cardboard cup was retained without observable leakage for in excess of 1 hour at which point observation was stopped.

Example 14

The sol of example 2 was mixed with 75 ml of water for 5 seconds at room temperature to initiate precipitation. White solid was observed to form in the previously clear solutions. The mixture was then sprayed onto the exposed surfaces of a permeable pulp plant pot within 10 minutes of the first observable formation of the white solid. The mixture was allowed to dry on the surface of the plant pot.

50 ml of dairy ice cream was added to each of the coated plant pot and a control plant pot with no coating and allowed to melt over the course of 2 hours. Liquid was observed permeating through the uncoated plant pot after approximately 30 minutes which became progressively more pronounced over the following hour. No permeation or leakage was observed in the coated plant pot during this period at which point observation was stopped.

Example 15

The sol of example 3 was mixed with 30 ml of water for 5 seconds at room temperature to initiate precipitation. White solid was observed to form in the previously clear solutions. The mixture was then rolled onto the exposed surfaces of a wooden tile within 12 minutes of the first observable formation of the white solid. The mixture was allowed to dry on the surface of the wooden tile.

Nine drops of water of approximately 0.75 ml each were place on the surface of the coated wooden tile in a three-by-three square grid. The process was repeated on an identical uncoated wooden tile. Over the next 5 to 10 minutes, the water droplets on the uncoated wooden tile were observably absorbed into the surface of the wooden tile leaving wet circular stains on the surface. The water droplets placed on the coated wooden tile remained on the surface for a period of 5 hours at which point observation was stopped.

Example 16

The coated wooden tile of example 15 was sliced in half to produce two tiles of half the thickness of the original tile. The surface of each of the half thickness tiles that had previously been on the inside of the original thicker tile were subjected to the water droplet experiment described in example 15. The water droplets were retained on the surfaces of each of the half thickness tiles for a period of 2 hours at which point observation was stopped.

Example 17

The experiment of example 15 was repeated using the sol of example 4 and pre-painted wooden tiles. The water droplets placed on the uncoated painted wooden tile were observed to be slowly absorbed into the surface of the tile across a period of 15-30 minutes. The water droplets placed on the surface of the coated wooden tile remained on the surface of the coated painted wooden tile for a period of 5 hours at which point observation was stopped.

Example 18

The sol of example 6 was mixed with 30 ml of water at room temperature to initiate precipitation. A textile square was immersed in the sol mixture approximately 10 minutes after the formation of white solid in the sol mixture. After immersion, the textile square was removed and allowed to dry.

Eight drops of water of approximately 0.75 ml each were placed on the surface of the coated textile square. The process was repeated on a second uncoated textile square. The water droplets were observed to be absorbed into the uncoated textile square within a period of 2 to 5 seconds. The water droplets on the coated textile square remained on the coated surface for a period of 5 hours at which point observation was stopped.

The invention claimed is:

1. A method comprising:
   (i) providing a sol comprising a solvent and a metal alkoxide;
   (ii) contacting the sol with a precipitation initiator to initiate precipitation of the sol, wherein the precipitation initiator is different to the solvent; and
   (iii) applying the precipitating sol to a product.

2. The method of claim 1, wherein the precipitation initiator comprises water or ethanol.

3. The method of claim 1, wherein the precipitation initiator comprises one or more functional additives.

4. The method of claim 1, wherein the sol comprises one or more functional additives.

5. The method of claim 3, wherein the one or more functional additives comprise a photo-initiator, resin, oils, dye, salt, mineral or other inorganic particles, surfactant, composite particle, and/or metal.

6. The method of claim 1, wherein the sol comprises one or more biopolymers.

7. The method of claim 6, wherein one or more biopolymers comprises a starch, modified starch, flour, or a modified flour.

8. The method of claim 1, wherein the metal of the metal alkoxide comprises silicon, titanium, aluminium, zirconium, tin, or any combination thereof.

9. The method of claim 1, wherein the metal of the metal alkoxide comprises silicon, titanium, aluminium, zirconium, or any combination thereof.

10. The method of claim 1, wherein the metal of the metal alkoxide comprises silicon, titanium, or any combination thereof.

11. The method of claim 1, wherein the metal of the metal alkoxide comprises silicon.

12. The method of claim 1, wherein the metal of the metal alkoxide comprises titanium.

13. The method of claim 1, wherein the alkoxide is selected from the group consisting of: Ti(isopropoxy)$_4$, Al(isopropoxy)$_3$, Al(sec-butoxy)$_3$, Zr(n-butoxy)$_4$, Zr(n-propoxy)$_4$, n-propyltriethoxysilane, tetrapropyl orthosilicate, titanium(IV) tert-butoxide, titanium(IV) isopropoxide, triethyloxysilane, methyltriethyloxysilane, triethoxy(octyl)silane, phenyl-triethoxysilane, titanium(iv) ethoxide, triethoxy-silylcyclopentane, (3-glycidyloxypropyl) trimethoxysilane, cyclopentyltriethoxysilane, 3-amino-propyltriethoxysilane, triethoxy-3-(2-imidazolin-1-yl) propylsilane, and any combination thereof.

14. The method of claim 1, wherein the alkoxide is selected from the group consisting of: tetrapropyl orthosilicate, titanium(IV) tert-butoxide, titanium(IV) isopropoxide, triethyloxysilane, methyltriethyloxysilane, triethoxy(octyl)silane, phenyl-triethoxysilane, titanium(iv) ethoxide, triethoxy-silylcyclopentane, (3-glycidyloxypropyl) trimethoxysilane, cyclopentyltriethoxysilane, or any combination thereof.

15. The method of claim 1, wherein the alkoxide is selected from the group consisting of: Si(OR)$_4$, Ti(OR)$_4$, Al(OR)$_3$, Zr(OR)$_3$, Sn(OR)$_4$, R$_c$—Si(OR)$_3$, R$_c$—Ti(OR)$_3$, R$_c$—Al(OR)$_2$, R$_c$—Zr(OR)$_2$ and R$_c$—Sn(OR)$_3$, or any combination thereof.

16. The method of claim 1, wherein the alkoxide is selected from the group consisting of: Ti(isopropoxy)$_4$, Al(isopropoxy)$_3$, Al(sec-butoxy)$_3$, Zr(n-butoxy)$_4$, Zr(n-propoxy)$_4$, and n-propyltriethoxysilane based alkoxides, and any combination thereof.

17. The method of claim 1, wherein the alkoxide is selected from the group consisting of: tetraethoxysilane, phenyltriethoxysilane, methyltriethyloxysilane, and any combination thereof.

18. The method of claim 1, wherein the solvent comprises one or more organic solvents.

19. The method of claim 18, wherein the one or more organic solvents comprise an alcohol.

20. The method of claim 19, wherein the alcohol is selected from the group consisting of: methanol, ethanol, isopropanol, butanol, ethylene glycol, or any combination thereof.

21. The method of claim 1, wherein the precipitating sol is applied to the product within 15 minutes of contacting the sol with the precipitation initiator.

22. The method of claim 1, where the precipitating sol is applied to the product within 15 seconds of contacting the sol with the precipitation initiator.

23. The method of claim 1, wherein the precipitating sol is applied to the product to form a coating on the product.

24. The method of claim 1, wherein the product is selected from the group consisting of: wooden products, textile products, leather products, metal (including alloy) products, concrete products or construction materials, cardboard products, paper or pulp products, plastic products, glass products, ceramic products, composite materials, sands, bricks, marbles, soils, paints, painted products, food and beverage products, medical devices, pharmaceutical products and combinations thereof.

25. The method of claim 1, wherein the precipitating sol is mixed into the product.

26. The method of claim 1, wherein the precipitating sol is applied to the product by brushing.

27. The method of claim 1, wherein the precipitating sol is applied to the product by spraying.

28. The method of claim 27, wherein the precipitating sol is applied to the product via a spray drying technique.

29. The method of claim 1, wherein the precipitating sol is applied to the product by rollers.

30. The method of claim 1, wherein the sol is formed less than 5 minutes prior to the step of contacting the sol with the precipitation initiator.

31. The method of claim 1, further comprising drying the product following application of the precipitating sol.

32. The method of claim 1, wherein the product is not actively heated to dry the product following application of the precipitating sol.

33. The method of claim 1, the method further comprising providing an apparatus comprising:

a first storage vessel;

a second storage vessel;

one or more pumps; and one or more delivery means for applying a sol and a precipitation initiator each stored in a respective one of the first and second storage vessels to a product.

\* \* \* \* \*